(12) United States Patent  
Bailey et al.

(10) Patent No.: US 6,648,274 B1
(45) Date of Patent: Nov. 18, 2003

(54) VIRTUAL REACTION WHEEL ARRAY

(76) Inventors: David A. Bailey, 6272 W. Melinda La., Glendale, AZ (US) 85308; Norman E. Johnson, 201 W. Conrad Dr., Phoenix, AZ (US) 85023

( * ) Notice: Subject to any disclaimer, the term of this patent is extended or adjusted under 35 U.S.C. 154(b) by 89 days.

(21) Appl. No.: 10/121,900

(22) Filed: Apr. 12, 2002

(51) Int. Cl.$^7$ ................................................ B64G 1/28
(52) U.S. Cl. ................... 244/165; 244/164; 701/13; 701/4
(58) Field of Search ...................... 244/158 R, 164, 244/165, 171; 701/4, 13

(56) References Cited

U.S. PATENT DOCUMENTS

| | | | |
|---|---|---|---|
| 3,968,352 A | * | 7/1976 | Andeen ........................ 701/13 |
| 4,723,735 A | | 2/1988 | Eisenhaure et al. |
| 4,825,716 A | | 5/1989 | Roberts et al. |
| 5,386,738 A | | 2/1995 | Havenhill |
| 5,437,420 A | | 8/1995 | Rosen |
| 5,611,505 A | | 3/1997 | Smay |
| 5,692,707 A | | 12/1997 | Smay |
| 5,875,676 A | | 3/1999 | Bailey et al. |
| 6,039,290 A | | 3/2000 | Wie et al. |
| 6,047,927 A | | 4/2000 | Heiberg et al. |
| 6,128,556 A | | 10/2000 | Bailey |
| 6,131,056 A | | 10/2000 | Bailey et al. |
| 6,135,392 A | | 10/2000 | Wakugawa |
| 6,182,582 B1 | | 2/2001 | Bailey et al. |
| 6,340,137 B1 | * | 1/2002 | Davis et al. ................. 244/165 |
| 6,341,750 B1 | * | 1/2002 | Chu et al. .................... 244/165 |
| 6,354,163 B1 | * | 3/2002 | Heiberg |
| 6,377,352 B1 | * | 4/2002 | Coronato et al. ............ 244/165 |
| 6,439,510 B1 | * | 8/2002 | Barde .......................... 244/165 |
| 6,463,365 B1 | * | 10/2002 | Anagnost et al. ............. 701/13 |

* cited by examiner

*Primary Examiner*—Michael J. Carone
*Assistant Examiner*—Lulit Semunegus

(57) ABSTRACT

An attitude control system (ACS) for a spacecraft includes an attitude control assembly (ACA) interface, a control moment gyro (CMG) array and a reaction wheel assembly (RWA) control unit. The ACA interface converts torque commands received from the RWA control unit into CMG gimbal rates for the CMG array. The ACA interface receives CMG gimbal angles from the CMGs and converts the CMG gimbals angles into RWA speeds, which are then provided to the RWA control unit.

16 Claims, 3 Drawing Sheets

VIRTUAL REACTION WHEEL ARRAY

BACKGROUND OF THE INVENTION

The present invention is generally directed to an attitude control system for a spacecraft and, more specifically, to controlling a control moment gyro array with a reaction wheel assembly control unit.

Presently, there are numerous three axis stabilized spacecraft (e.g., satellites) that use reaction wheel assemblies (RWAs) for attitude control. Due to the complexity of spacecraft attitude control, the monetary investment in software for a typical RWA control unit is generally quite large. Typically, signals provided by an inertial sensor as well as reference signals provided by other sensors (e.g., earth, sun and star sensors), incorporated within the spacecraft, are utilized by the RWA control unit to determine the effect on the spacecraft when a speed of a rotor, i.e., a wheel, of an RWA has been changed. In general, each sensor and wheel has included an interface, which allows the sensors and wheels to provide information to and/or receive information from the RWA control unit in a designated format (e.g., 1553 protocol). In this manner, the RWA control unit can appropriately control the telemetry of the spacecraft.

To achieve attitude control of the spacecraft, a typical RWA control unit provides torque signals to each RWA associated actuator (e.g., motor/generator), which cause an associated rotor, i.e., wheel, to turn at a desired speed, which wheel speed is, in turn, provided to the RWA control unit. In general, a wheel speed ($\omega$) is related to a torque command ($\tau$) by the following equation:

$$\omega = \frac{\tau}{J \cdot S}$$

where J is the moment of inertia of a given RWA wheel and S is the Laplace Operator.

In general, a torque command is received by an RWA interface, which provides an appropriate signal to the motor and also provides feedback to the RWA control unit, in the form of an associated wheel speed. Each RWA may have it own RWA interface or a centralized interface may be utilized for all of the RWAs. The speeds received by the RWA control unit are utilized, in part, to determine an appropriate external torque for the satellite, so as to desaturate stored angular momentum of the RWA array. Various desaturation techniques may be implemented, such as magnetic torquer bars that produce a torque by reacting against the earth's magnetic field or hot or cold gas thrusters may be used in pairs to produce a desired torque. While many spacecraft would benefit from the increased agility provided by control moment gyros (CMGs), many spacecraft manufacturers have not gravitated to CMG arrays due to the large monetary investment incurred in writing and refining software to control RWA arrays.

Thus, it would be desirable to provide an attitude control system for a spacecraft that is capable of utilizing a reaction wheel assembly (RWA) control unit to control a control moment gyro (CMG) array.

SUMMARY OF THE INVENTION

The present invention is directed to an attitude control system for a spacecraft that includes an attitude control assembly (ACA) interface, a control moment gyro (CMG) array and a reaction wheel assembly (RWA) control unit. The CMG array includes a plurality of CMGs, which are coupled to and receive CMG gimbal rates from the ACA interface and provide CMG gimbal angles to the ACA interface. The RWA control unit is coupled to the ACA interface and provides RWA torque commands to the ACA interface. The ACA interface converts the torque commands to CMG gimbal rates and receives CMG gimbal angles from the CMGs and converts the CMG gimbals angles into RWA speeds, which are provided to the RWA control unit.

These and other features, advantages and objects of the present invention will be further understood and appreciated by those skilled in the art by reference to the following specification, claims and appended drawings.

DETAILED DESCRIPTION OF THE PREFERRED EMBODIMENT(S)

According to the present invention, an attitude control system (ACS) for a spacecraft utilizes a reaction wheel assembly (RWA) control unit to control a control moment gyro (CMG) array. This advantageously allows satellite designers to utilize CMG arrays for increased spacecraft agility, while re-utilizing software developed for RWA array control.

Figure 1:
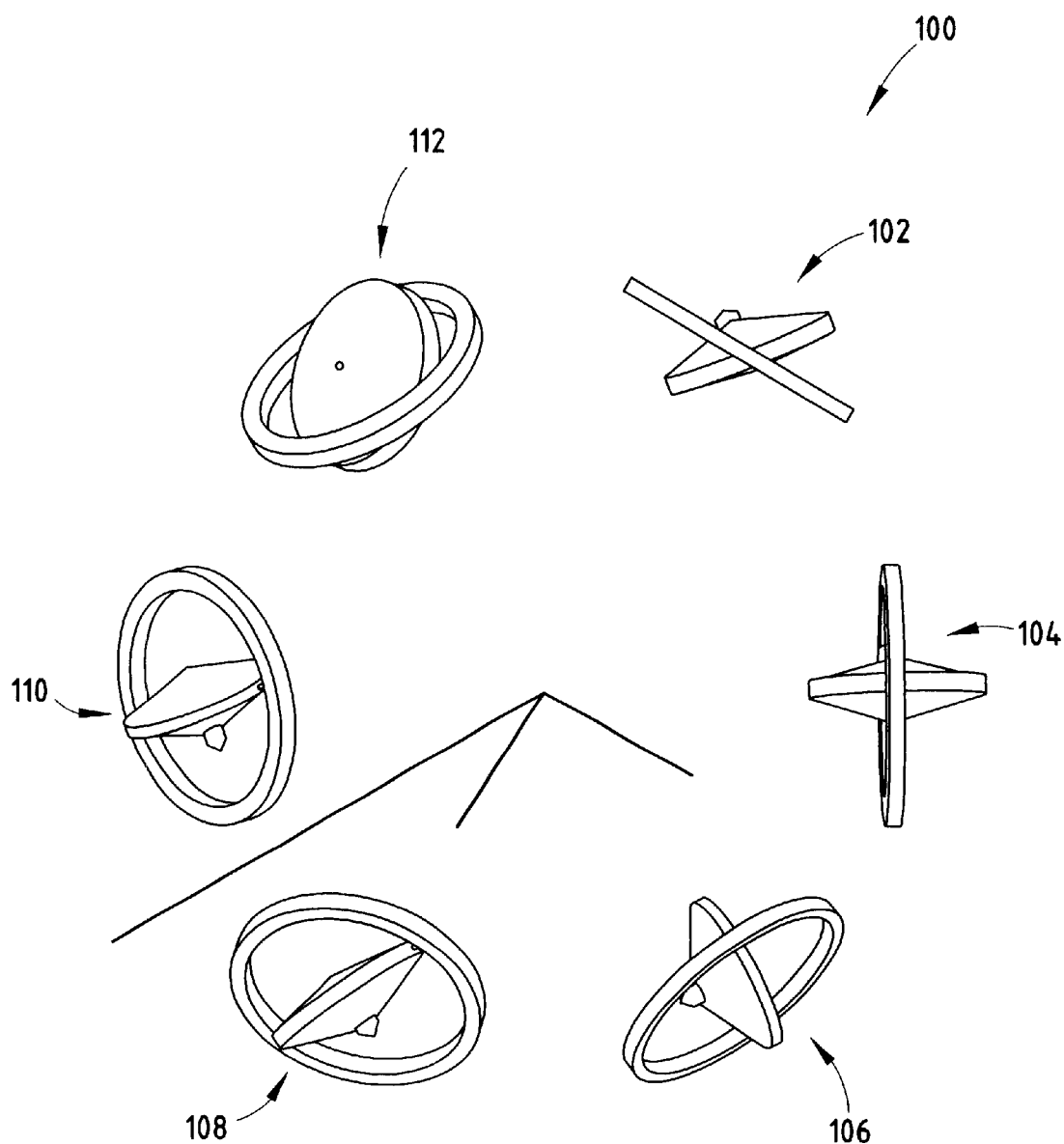
FIG. 1 is a block diagram of an exemplary spacecraft with a plurality of control moment gyros (CMGs) arranged in a pyramidal configuration for orienting the spacecraft about any arbitrary axis.

FIG. 1 depicts an exemplary CMG array 100, incorporated within an associated spacecraft, that includes six CMGs 102–112 aligned in a pyramidal configuration. According to the present invention, the CMGs 102–112 may be controlled by an RWA control unit, via an interface, to control the attitude of the spacecraft.

Figure 2:
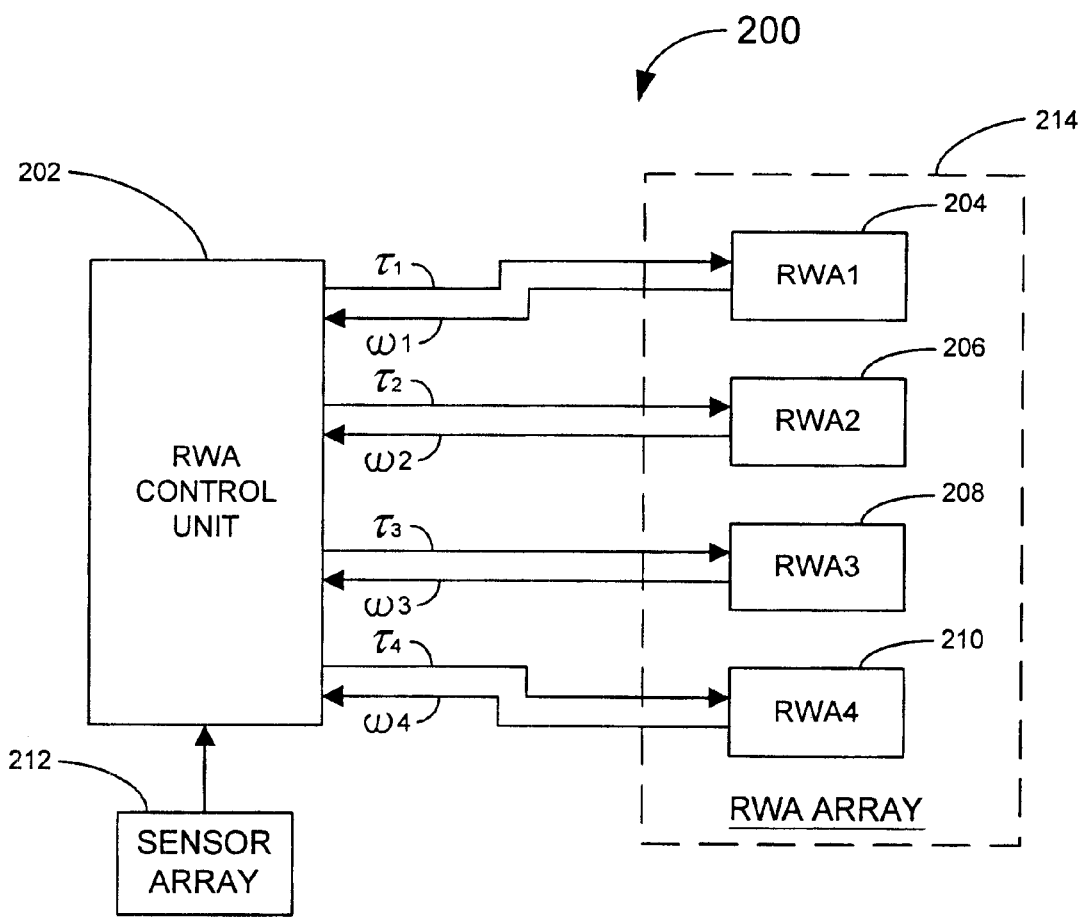
FIG. 2 is a block diagram of an exemplary reaction wheel assembly (RWA) control unit coupled to an RWA array.

FIG. 2 illustrates an exemplary attitude control system 200, which includes an RWA control unit 202 that is coupled to a plurality of reaction wheel assemblies (RWAs) 204, 206, 208 and 210, which form an RWA array 214. The RWA control unit 202 is programmed to provide torque commands ($\tau$) to each of the RWAs 204–210 and to receive wheel speeds ($\omega$) from each of the RWAs 204–210. The RWA control unit 202 also receives inputs from a sensor array 212, which includes an inertial sensor and may include earth, sun and star sensors.

Figure 3:
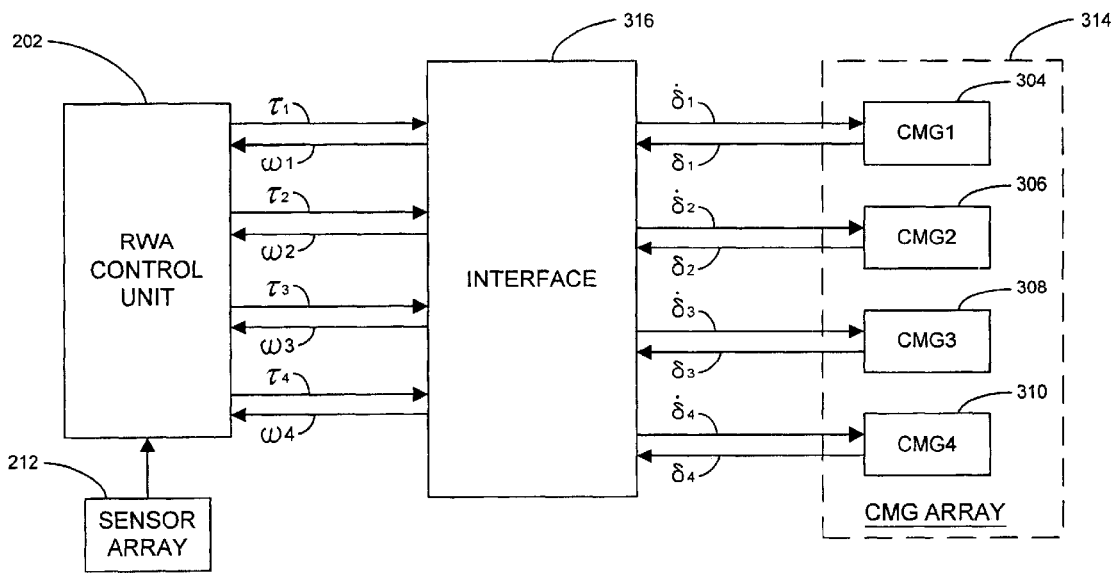
FIG. 3 is a block diagram of an RWA control unit that is coupled to a CMG array by an ACA interface, according to an embodiment of the present invention.

According to an embodiment of the present invention, as is shown in FIG. 3, an interface 316 is implemented, which allows the RWA control unit 202 to be utilized to control a control moment gyro (CMG) array 314. That is, the interface 316 converts torque commands received from the RWA control unit 202 into CMG gimbal rates ($\dot{\delta}$) for each of a plurality of control moment gyros (CMGs) 304, 306, 308 and 310, included within CMG array 314. Each of the CMGs 304–310 provide CMG gimbal angles ($\delta$) to the interface 316 which converts the gimbal angles into wheel speeds ($\omega$) which are provided to the RWA control unit 202. In this manner, the RWA control unit 202 can continue to utilize software that was developed to control RWA arrays, while at the same time benefiting from the increased agility provided by CMG arrays.

Figure 4:
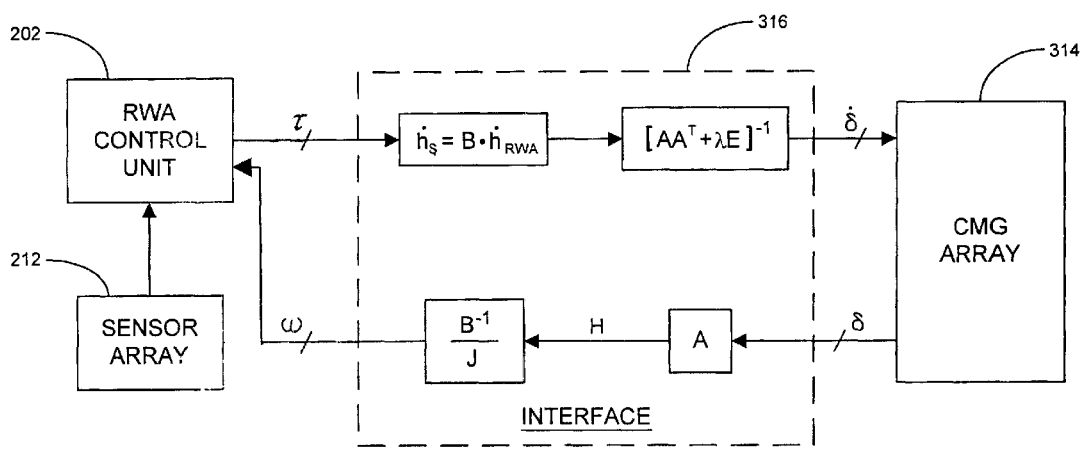
FIG. 4 is a block diagram depicting the transfer functions implemented by the interface of FIG. 3.

FIG. 4 shows transfer functions implemented within the interface 316 of FIG. 3. It should be appreciated that the transfer functions can be realized in hardware or software. As is shown, a plurality of torque commands ($\tau$) are provided by the RWA control unit 202 to the interface 316. The product of the torque commands ($\tau$) and a satellite angular momentum rate ($h_s$) yield satellite torques $\omega s$. The satellite angular momentum rate ($h_s$) is defined by the following formula:

$$h_s = B \cdot h_{rwa}$$

where 'B' is the Jacobian from RWA speed to angular momentum $$\left(\frac{\partial H}{\partial w_{rwa}}\right).$$

The Jacobian 'B' matrix is a '3×n' matrix of rank 3, where 'n' is the number of active RWAs. The product of the satellite torque command $\omega s$ and a transfer function $[AA^T + \lambda E]^{-1}$ provides the gimbal rate ($\delta$), which is provided to the CMG array 314. As used herein, 'A' is the Jacobian from CMG angle to angular momentum $$\left(\frac{\partial H}{\partial \delta}\right),$$

where 'H' is the angular momentum and '$\delta$' is the CMG gimbal angle. The robust pseudo inverse, as is disclosed in U.S. Pat. No. 6,039,290, the disclosure of which is incorporated herein by reference in its entirety, is used to transform the torque command to the CMG gimbal rate.

The CMGs integrate the respective gimbal rate producing gimble angles ($\delta$). The product of the gimbal angles ($\delta$) and the 'A' matrix yield the stored angular momentum 'H' of the CMG array. The product of the inverse 'B' matrix and the angular momentum 'H' is then divided by the wheel moment of inertia 'J' to yield equivalent speeds ($\omega$) of the virtual RWA. If 'n' (i.e., the number of wheels implemented) is greater than three, then $B^{-1}$ represents the pseudo inverse of 'B', which is the Jacobian from the RWA speed to the angular momentum. The speeds ($\omega$) are then fed back to the RWA control unit 202 such that the RWA control unit 202 can manage the store angular momentum of the spacecraft in a conventional manner.

Accordingly, an attitude control system has been described herein that includes an attitude control assembly (ACA) interface that receives RWA torque commands from an RWA control unit and converts the torque commands to CMG gimbal rates, which are provided to a CMG array. The ACA interface also converts gimbal angles received from the CMG array into RWA wheel speeds, which are provided to the RWA control unit.

The above description is considered that of the preferred embodiments only. Modification of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. An attitude control system for a spacecraft, the system comprising:

an attitude control assembly (ACA) interface;

a control moment gyro (CMG) array including a plurality of CMGs which are coupled to and receive CMG gimbal rates from the ACA interface and provide CMG gimbal angles to the ACA interface; and a reaction wheel assembly (RWA) control unit coupled to the ACA interface, wherein the ACA interface receives RWA torque commands from the RWA control unit and converts the torque commands to the CMG gimbal rates, and wherein the ACA interface receives the CMG gimbal angles from the CMGs and converts the CMG gimbal angles into RWA wheel speeds which are provided to the RWA control unit.

2. The system of claim 1, wherein the CMGs are single gimbled CMGs.

3. The system of claim 1, wherein the CMGs are double gimbled CMGs.

4. The system of claim 1, wherein the CMG array includes three CMGs.

5. The system of claim 1, wherein the CMG array includes four CMGs.

6. The system of claim 1, further including:

a sensor array coupled to RWA control unit, the sensor array providing inertial information to the RWA control unit.

7. An attitude control system for a spacecraft, the system comprising:

an attitude control assembly (ACA) interface;

a control moment gyro (CMG) array including a plurality of CMGs which are coupled to and receive CMG gimbal rates from the ACA interface and provide CMG gimbal angles to the ACA interface;

a reaction wheel assembly (RWA) control unit coupled to the ACA interface, wherein the ACA interface receives RWA torque commands from the RWA control unit and converts the torque commands to the CMG gimbal rates, and wherein the ACA interface receives the CMG gimbal angles from the CMGs and converts the CMG gimbal angles into RWA wheel speeds which are provided to the RWA control unit; and a sensor array coupled to RWA control unit, the sensor array providing inertial information to the RWA control unit.

8. The system of claim 7, wherein the CMGs are single gimbaled CMGs.

9. The system of claim 7, wherein the CMGs are double gimbaled CMGs.

10. The system of claim 7, wherein the CMG array includes three CMGs.

11. The system of claim 7, wherein the CMG array includes four CMGs.

12. An attitude control system for a spacecraft, the system comprising:

an attitude control assembly (ACA) interface;

a control moment gyro (CMG) array including a plurality of CMGs which are coupled to and receive CMG gimbal rates from the ACA interface and provide CMG gimbal angles to the ACA interface;

a reaction wheel assembly (RWA) control unit coupled to the ACA interface, wherein the ACA interface receives RWA torque commands from the RWA control unit and converts the torque commands to the CMG gimbal rates, and wherein the ACA interface receives the CMG gimbal angles from the CMGs and converts the CMG gimbal angles into RWA wheel speeds which are provided to the RWA control unit; and a sensor array coupled to RWA control unit, wherein the sensor array includes an inertial sensor that provides inertial information to the RWA control unit and at least one of earth, sun and star sensors that provide reference signals to the RWA control unit.

13. The system of claim 12, wherein the CMGs are single gimbaled CMGs.

14. The system of claim 12, wherein the CMGs are double gimbaled CMGs.

15. The system of claim 12, wherein the CMG array includes three CMGs.

16. The system of claim 12, wherein the CMG array includes four CMGs.

* * * * *